United States Patent
Arelt

(10) Patent No.: US 7,334,989 B2
(45) Date of Patent: Feb. 26, 2008

(54) METHOD FOR PRODUCING A ROTOR BLADE, A CORRESPONDING ROTOR BLADE AND A WIND POWER PLANT

(75) Inventor: Rainer Arelt, Salzbergen (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/523,103

(22) PCT Filed: Aug. 4, 2003

(86) PCT No.: PCT/EP03/08618

§ 371 (c)(1), (2), (4) Date: Aug. 22, 2005

(87) PCT Pub. No.: WO2004/015265

PCT Pub. Date: Feb. 19, 2004

(65) Prior Publication Data

US 2006/0127222 A1    Jun. 15, 2006

(30) Foreign Application Priority Data

Aug. 2, 2002  (DE)  ............................... 102 35 496

(51) Int. Cl.
*F03D 11/00*    (2006.01)

(52) U.S. Cl. ...................................... 416/2; 416/229 R
(58) Field of Classification Search ............... 416/2, 416/212 R, 213 A, 229 R, 238, 224; 29/889.7, 29/889.72, 889.721; 403/270; 244/124
See application file for complete search history.

(56) References Cited

U.S. PATENT DOCUMENTS

| 4,120,998 A | * | 10/1978 | Olez | ........................... 403/270 |
| 4,474,536 A | * | 10/1984 | Gougeon et al. | ........... 416/226 |
| 6,638,466 B1 | * | 10/2003 | Abbott | ....................... 264/238 |
| 2006/0083611 A1 | * | 4/2006 | Wobben | ........................ 416/2 |

* cited by examiner

*Primary Examiner*—Richard A. Edgar
(74) *Attorney, Agent, or Firm*—Blakely, Sokoloff, Taylor & Zafman LLP

(57) ABSTRACT

The invention relates to a process for producing a rotor blade for a wind power system, wherein at least two rotor blade elements are arranged one behind the other in a longitudinal direction of the rotor blade and are glued together via at least one, preferably at least two connecting elements bridging a partition line between the rotor blade elements, wherein at least one connecting element is aligned with said rotor blade elements, wherein a hollow space is formed between an outer delimitation surface of at least one of the rotor blade elements and at least one fixing segment of the inner delimitation surface of said connecting element, and subsequently the hollow space is flooded with an adhesive (resin).

31 Claims, 5 Drawing Sheets

Figure 1:
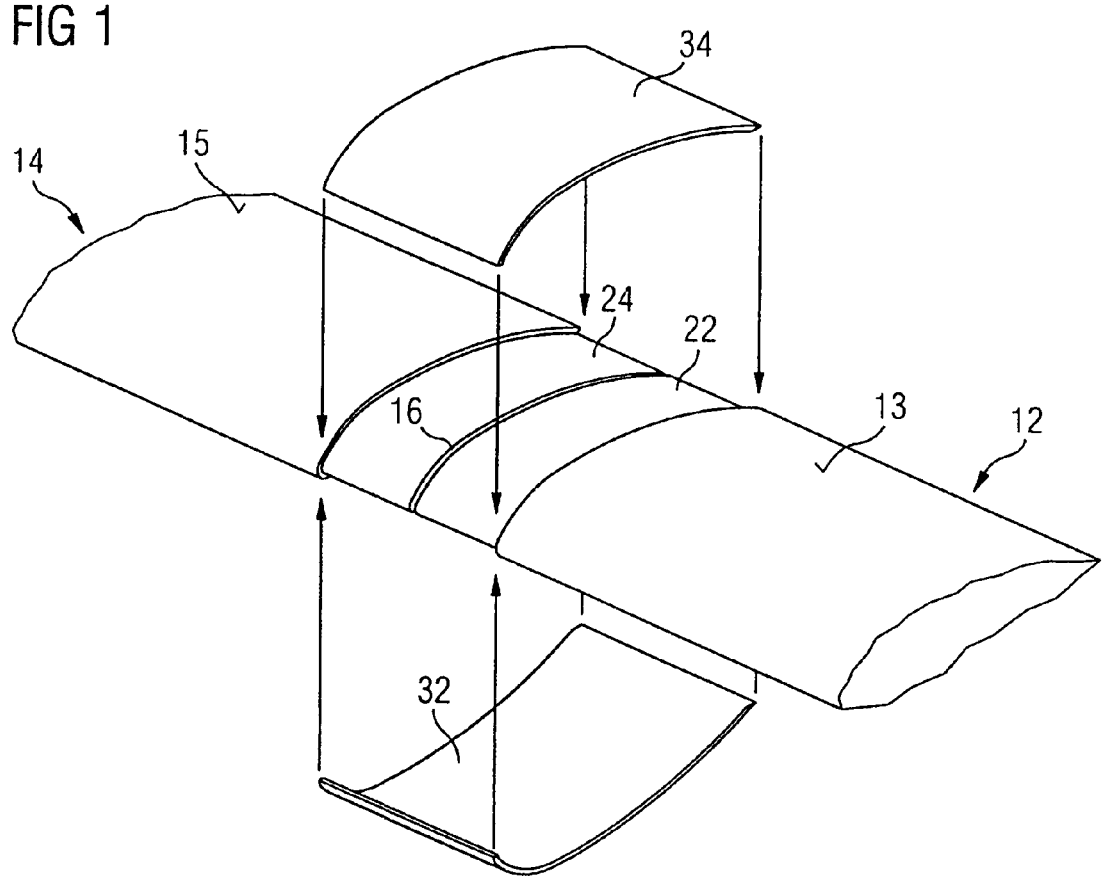

METHOD FOR PRODUCING A ROTOR BLADE, A CORRESPONDING ROTOR BLADE AND A WIND POWER PLANT

CROSS-REFERENCE TO OTHER APPLICATIONS

This application is a National Phase Application of International Application No. PCT/EP2003/008618, filed Aug. 4, 2003, which claims priority from German Patent Application No. 102 35 496.0, filed Aug. 2, 2002.

The invention relates to a process for producing a rotor blade for the rotor of a wind power system having at least two rotor blade elements arranged one behind the other in a longitudinal direction of the rotor blade and glued together, a rotor blade produced by this process, and a wind power system having a rotor blade of this kind.

Large wind energy systems have a nominal power of several megawatts. To maintain these high powers, rotors having diameters of 100 m and more are used. Correspondingly, the rotor blades for producing these rotors can have lengths of 50 m or more. These rotor blades are usually produced in the form of hollow profiles, in which one ore more bars absorbing bending moments are integrated. Both manufacture and transport of such large structural members creates considerable problems. For this reason, rotor blades of the kind mentioned before having rotor blade elements which are individually transported to the place of the wind power system where they are to be put up and which can only be assembled there have already been proposed. For this purpose, processes of the kind described in the beginning have already been proposed. With these processes, a connection of the rotor blade elements can be achieved without influencing the aerodynamic properties of the rotor blade and also without adding additional weights to the rotor blade. However, it has turned out that these rotor blades do not withstand the considerable changing loads during operation of a wind power system. In view of these problems, WO 01/48378 A1 proposes the use of rotor blades where the individual rotor blade elements are connected with the help of splice-pieces bridging a separation line between these elements, wherein said splice-pieces surround determined bolts in the region of the ends of the rotor blade elements facing each other. By a special shaping of the bolts, a tensile-force prestress is produced in the region of the separation line between the individual rotor blade elements in the case of the rotor blade proposed by WO 01/48378 A1. By means of said tensile-force prestress, it is achieved that, despite the alternating load stress in the course of a rotation of the rotor of a wind power system, only tensile forces are produced in the region of the separation line, wherein only the extent thereof varies.

However, the use of the rotor blades described in WO 01/48378 A1 showed that cracks were created and other damages were caused in the region of the separation line between the individual rotor blade elements during permanent operation of a wind power system.

In view of these problems in the prior art, the object of the invention is to provide a process for producing rotor blades for wind power systems with which rotor blades suitable for a permanent operation of a wind power system and having predetermined aerodynamic properties can be produced, to give rotor blades produced by said process and to provide wind power systems produced using such rotor blades.

With respect to the process, the object is solved by an improvement of the known processes for producing rotor blades for wind power systems, wherein at least two rotor blade elements are arranged one behind the other in a longitudinal direction of the rotor blade and glued together via at least one, preferably two connecting elements bridging a partition line between the rotor blade elements, substantially characterized in that at least one connecting element is aligned with said rotor blade elements, wherein a hollow space is formed between an outer delimitation surface of at least one of the rotor blade elements and at least one fixing segment of the inner delimitation surface of said connecting element, and subsequently the hollow space is flooded with an adhesive.

The invention was made as a result of the realization that the damages observed when using the rotor blades of WO 01/48378 A1 primarily result from the mechanical connecting elements or bolts necessary for a positive-locking connection, via which forces produced during operation of the wind power system are introduced into the structure of the rotor blade in a nearly point-shaped concentration and cause high stress peaks, which lead to the damages observed, whereas, in the case of the conventional rotor blades having rotor blade elements glued together, an insufficient strength of the adhesive connection is caused by the fact that, for creating the adhesive connection, an adhesive is first applied onto the adherends, and then the connecting element is put onto said adherends and aligned. This aligning process can cause local inclusions of air or thickness variations of the adhesive distribution, which cause the insufficient strength of the adhesive connection as observed. In the processes of the invention, these disadvantages are eliminated in that the connecting element is first aligned with the rotor blade elements, and only after that, the hollow space formed between the connecting element and the rotor blade elements is flooded with the adhesive, so that a later change in the adhesive distribution caused by the aligning process will not occur any longer. The rotor blade elements can be held in the desired position here with the help of a suitable aligning equipment before, during and/or after the gluing process.

Moreover, in the case of the adhesive connection as proposed by the invention, the introduction of force can be effected via large-surface rotor blade segments in order to avoid the generation of stress peaks during operation of the wind power system.

To obtain a connection having the desired strength properties without influencing the aerodynamic properties of the rotor blade, it has turned out to be particularly suitable to lock the alignment of the connecting element before flooding the hollow space by gluing a locking rim of the inner delimitation surface of the connecting element, at least partially surrounding the fixing segment of the inner delimitation surface of the connecting element, to an outer delimitation surface of at least one of the rotor blade elements. In this way, it is possible to achieve an alignment without the use of mechanical locking elements, whereby the risk of the generation of local stress peaks can be further reduced. In the locking process, suitably, a thickened epoxy resin and/or polyester resin or the like is evenly distributed onto the locking rim and/or the outer delimitation surface of the rotor blade element corresponding to the locking rim without any inclusions of air. In this process, the even distribution can be controlled by applying a larger amount of resin than would be necessary for the gluing thickness, and the use of a sufficient adhesive thickness is examined in that the pressing out of the epoxy resin at all places of the locking rim is observed. Apart from the locking of the connecting element, by gluing the connecting element in the region of the locking rim, a sealing of the hollow space to be subsequently flooded with adhesive is achieved as well. Then, the uniform flooding of the hollow space with the adhesive, in order to avoid inclusions of air in the hollow space, can be promoted in that, for flooding, a negative pressure is generated in the hollow space, with which the adhesive is sucked into the hollow space, and/or the adhesive is pumped into the hollow space with overpressure.

It is suitable in this procedure to put the rotor blade into a vertical position after curing of the first bond in the region of the locking rim, and to subsequently flood the hollow space formed between connecting element and rotor blade element with resin. The adhesive is then driven into the hollow space with overpressure, wherein the formation of inclusions of air is prevented by applying a vacuum to the place of exit in order to suck the air out of the hollow space. With the processes of the invention, especially good results can be achieved if the hollow space is flooded with an adhesive with a dynamic viscosity $\eta$ in the range of about 130-230 Mpas, preferably about 150-210 Mpas, particularly preferably about 170-190 Mpas, in particular about 180 Mpas and/or a kinematic viscosity $v=\eta/\rho$ in the range of about $1.2\text{-}2\times10^5$ m$^2$/s, preferably about $1.4\text{-}1.8\times10^5$ m$^2$/s, in particular about $1.6\times10^5$ m$^2$/s. Liquid epoxy resin is suitably used therefore. After flooding, the adhesive can be hardened or tempered at room temperature and/or for a period of time of 6-10 hours at a temperature of about 70° C.

A particularly reliable filling of the hollow space can be achieved if the supply of resin is effected at the deepest location of the hollow space as seen from the outer delimitation surface of the rotor blade and/or the negative pressure is generated at the location which is located highest in the hollow space. It is also possible to guarantee the keeping of the dimensions of the hollow space after the generation of the negative pressure by using suitable spacers such as ground distance blocks of hardened resin. The process of the invention is particularly advantageously used for connection in the area of the belts integrated into the shells for absorbing bending moments, as in this case it is especially important to keep to exact adhesive thicknesses and an optical examination of the complete gluing is not possible.

As for the rest, compared to rotor blades formed as one piece, rotor blades within the scope of the invention can be produced without additional masses. Moreover, the adhesive connection of the rotor blade elements according to the invention makes it possible to put said elements together without forming excessive stiffness discontinuities in the rotor blades, whereby the durability of the connection during operation of the wind power system is further promoted. Finally, the embodiment of the invention also considers the fact that the transmission of power in fiber composites usually used for producing rotor blades of wind power systems has to extend over a surface which should be as large as possible.

Basically, it is also considered within the scope of the invention to equip one of the rotor blade elements with a collar protruding in a longitudinal direction from a fore-part therefrom and to equip the other rotor blade element at its end facing the collar with an accordingly reduced cross-sectional area, so that said other rotor blade element can be pushed under the collar and subsequently gluing can be effected between the rotor blade elements. However, it has turned out to be especially advantageous with respect to manufacture to provide at least one, preferably at least two connecting elements bridging a partition line between the rotor blade elements and having at least two adherend segments, wherein each of the adherend segments is glued together with one of the rotor blade elements over a large surface. The connecting elements can at least partially surround the longitudinal axis of the rotor blade in the region of the separation line here. In the case of such a connection, the rotor blade elements can be produced using the common molds which are also used for making integral rotor blades by putting separating films into said mold, which make it possible to separate the individual rotor blade elements from each other without destruction during removal of the rotor blade from the mold.

In a particularly preferred embodiment of the invention, the at least one connecting element is at least partially accommodated in a recess formed in the outer delimitation surfaces of the rotor blade elements in the region of the separation line. In this case, the connecting element can have a construction corresponding to the construction of adjacent regions of the rotor blade elements, preferably a laminate-shaped construction, in order to obtain the necessary material thicknesses altogether at each location of the connection area in the region of the separation line after gluing.

For creating a particularly durable connection, it will be especially advantageous if the recess formed in the outer delimitation surfaces of the rotor blade elements in the region of the separation line completely surrounds the longitudinal axis of the rotor blade. Two or more connecting elements can then be put into said recess for creating the desired connection. In view of the maintenance of the desired strength in the region of the connection between the individual rotor blade elements, it has turned out to be especially advantageous if the circumference of at least one rotor blade element tapers towards the separation line preferably in a wedge-shaped manner in a cutting plane extending perpendicularly to the longitudinal axis for forming the recess. Said wedge-shaped tapering of the rotor blade elements also referred to as scarf enables an especially smooth transition in the region of the separation line between the rotor blade elements, which helps to avoid excessive stress peaks.

In the rotor blade of the invention, the forces and moments in the region of the separation line are transmitted by thrust in the adherends, so that a permanent fixed connection can be obtained by the selection of a suitable gluing process. To obtain a connection between the rotor blade elements and the connecting elements which extends over a surface which is as large as possible, said connecting elements suitably have an inner delimitation surface extending in a complementary manner to the profile of the recess, wherein a gap filled by an adhesive can be left out between the delimitation surface of the recess and the inner delimitation surface of the connecting element. A rotor blade of the invention can be designed without any influence on the aerodynamic properties in the region of the separation line if the connecting element has an outer surface which is flush with the adjacent regions of the outer surfaces of the rotor blade elements.

As already explained above, the rotor blade element of the invention can be constructed in the form of a hollow body with a shell accommodating at least one bar absorbing bending moments. In the case of such rotor blade elements, the shell is suitably formed of fiber-reinforced plastics. The bending forces are absorbed by the bar integrated into the shells in this case. The bars commonly consist of two belts integrated into the shell halves and connected to each other via one or more bridges.

As evident from the explanation above regarding rotor blades of the invention, a wind power system of the invention having a rotor having at least one rotor blade and being pivoted about a rotor axis extending approximately horizontally, wherein at least one rotor blade has at least two rotor blade elements arranged one behind the other in a longitudinal direction of the rotor blade and connected to each other, is essentially characterized in that at least two of the rotor blade elements are glued together, wherein the adhesive connection is effected by flooding a hollow space formed between a connecting element and the rotor blade elements.

As already explained above, rotor blade elements suitable for producing rotor blades according to the invention can be produced in the same mold as used for the common integral rotor blades if, at the desired place of separation, a forming part, and, if necessary, for the formation of the hollow space, a separating film is put into said mold. Also the connecting element can be produced in the same mold as the rotor blade elements if the forming part is removed from said mold and a filling part made complementary thereto is inserted, so that a connecting element having the shape of the forming part can be produced.

A rotor blade produced according to the invention can also be separated again at the place of connection. It is simply sawn by a cut perpendicular to the longitudinal axis of the rotor blade. Subsequently, only the scarf surfaces have to be created again by means of grinding or milling. At the construction site, the rotor blade can then again be assembled and connected by the process described above.

Within the scope of the invention, for making a connection between the rotor blade elements, the use of mechanical connecting elements can be dispensed. Thus, the connection proposed by the invention is suitable for fiber composites and therefore very light. The only additional mass compared to integrally formed rotor blades is the adhesive mass. The connection can be effected via preformed parts which contain all the structural elements of the nondivided rotor blade and, once hardened completely, only have to be connected to the surfaces of the rotor blade by an adhesive with a defined thickness.

Figure 3:
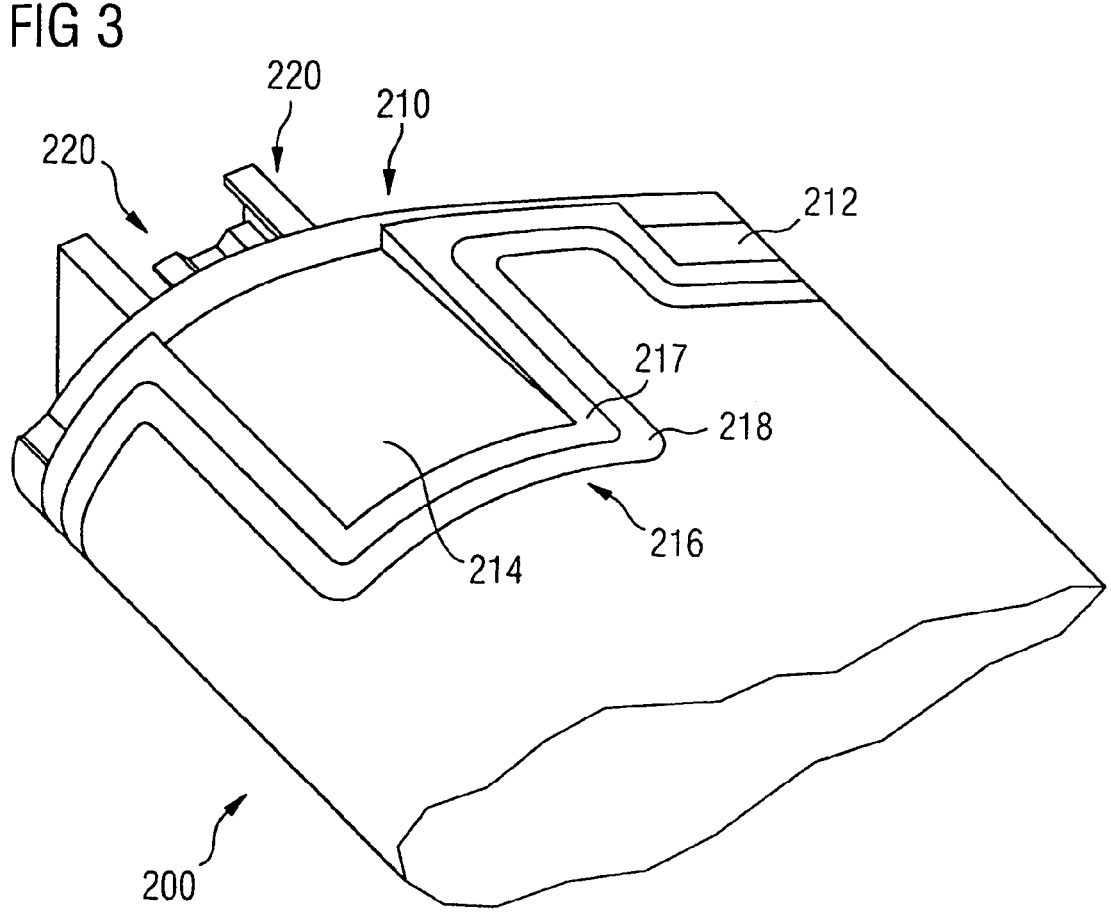
Figure 4:
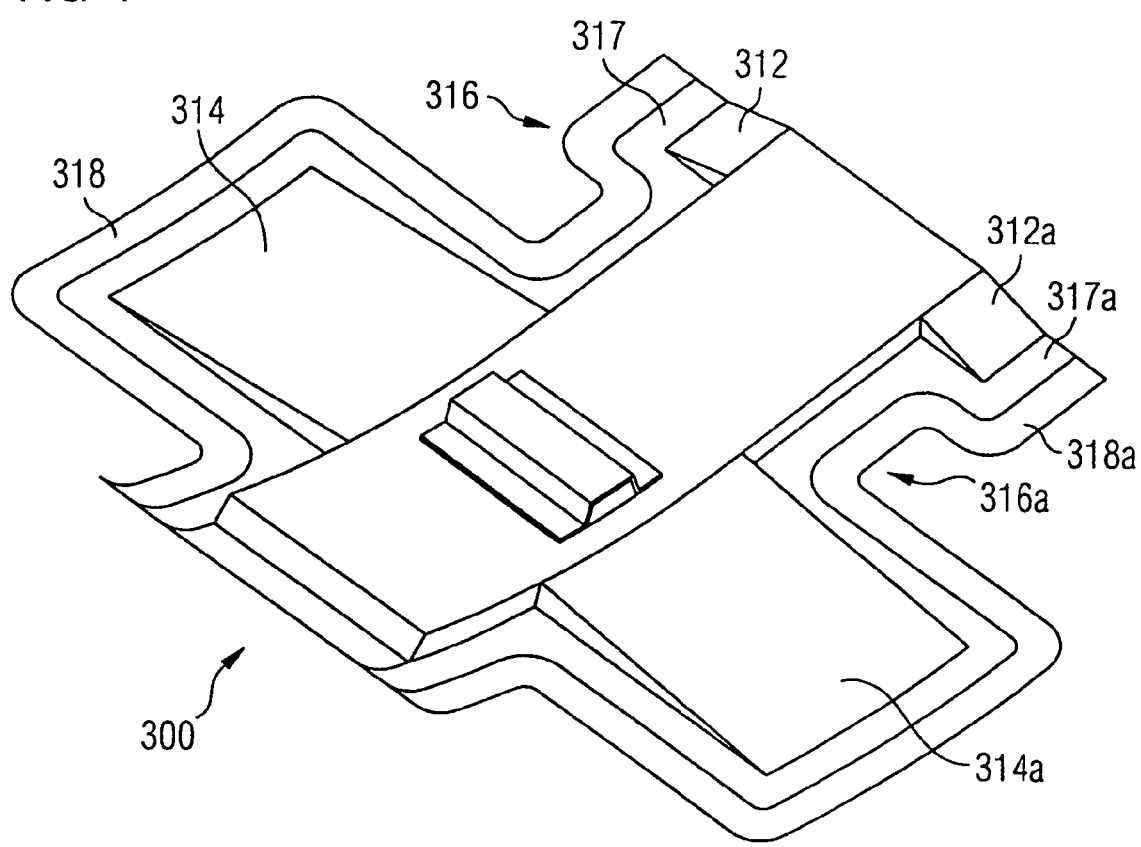
Figure 5:
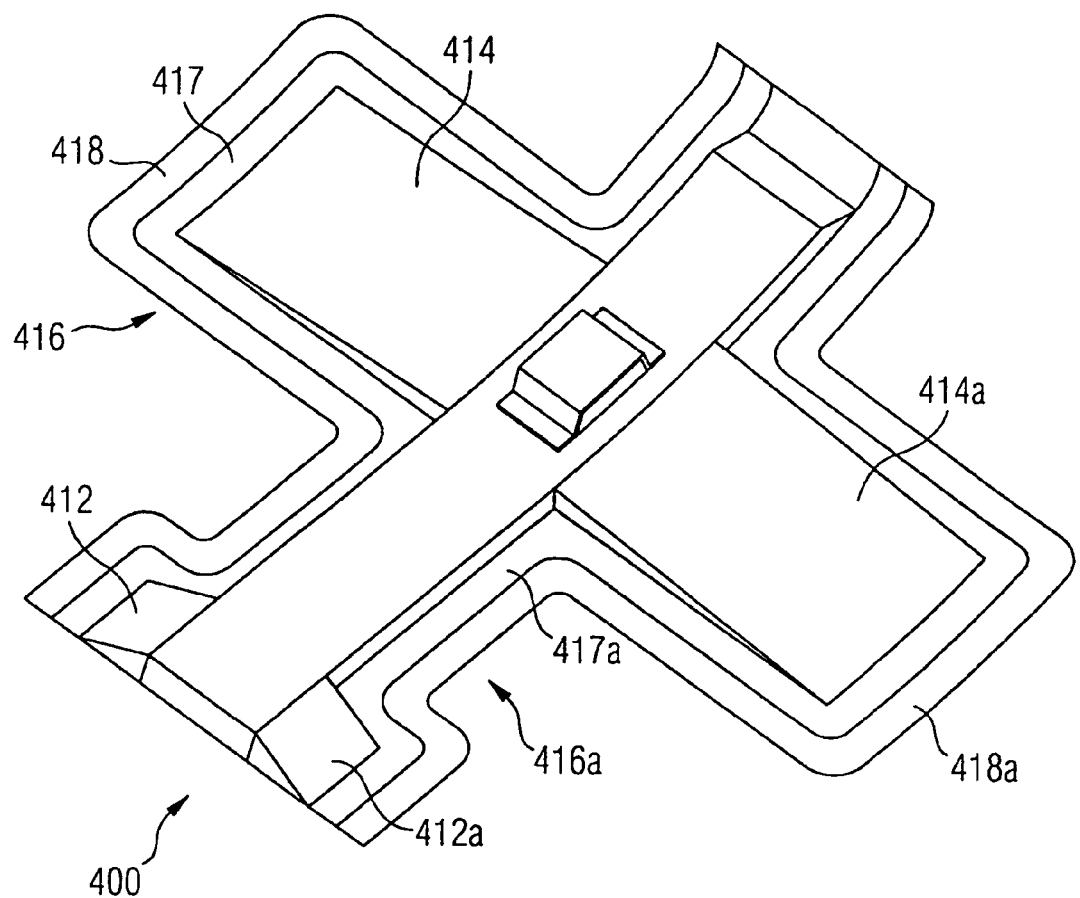

In the following, the invention will be explained with reference to the drawing. Concerning all details which are essential regarding the invention and are not explained in greater detail in the description, reference is made to said drawing, in which FIG. 1 shows an explosive view of a rotor blade according to a first embodiment of the invention, FIG. 2 shows a perspective view of a rotor blade element of a rotor blade according to a second embodiment of the invention, wherein said rotor blade element is to be arranged radially inside, FIG. 3 shows a perspective view of a rotor blade element of a rotor blade according to the second embodiment of the invention, wherein said rotor blade element is to be arranged radially outside, FIG. 4 shows an upper connecting element for connecting the rotor blade elements shown in FIGS. 2 and 3 and FIG. 5 shows a lower connecting element for connecting the rotor blade elements shown in FIGS. 2 and 3.

The rotor blade shown in the drawing comprises two rotor blade elements 12 and 14 arranged one behind the other in a longitudinal direction, and two connecting elements 32 and 34 bridging a partition line 16 between the rotor blade elements. In an assembled state, said connecting elements are arranged in recesses 22 and 24 of the rotor blade elements 12 and 14 formed by a diminution of the ends of the rotor blade elements 12 and 14 facing the partition line. In the embodiment shown in the drawing, said recesses 22 and 24 are designed in such a way that they completely surround the longitudinal axis of the rotor blade. The dimensions of the connecting elements 32 and 34 are designed to match those of said recesses 22 and 24 in such a way that the connecting elements 32 and 34, when in flush alignment with the outer delimitation surfaces 13 and 15 of the rotor blade elements, still leave a hollow space between the delimitation surfaces of the rotor blade elements 12 and 14 forming said recesses 22 and 24 and the inner delimitation surfaces of said connecting elements 32 and 34.

For assembly of the rotor blade shown in the drawing, said rotor blade elements 12 and 14 and said connecting elements 32 and 34 are first brought into the desired flush alignment. Then, the hollow space formed between the outer delimitation surfaces of the recesses 22 and 24 and the inner delimitation surfaces of the connecting elements 32 and 34 is flooded with an adhesive, which is hardened subsequently.

Figure 2:
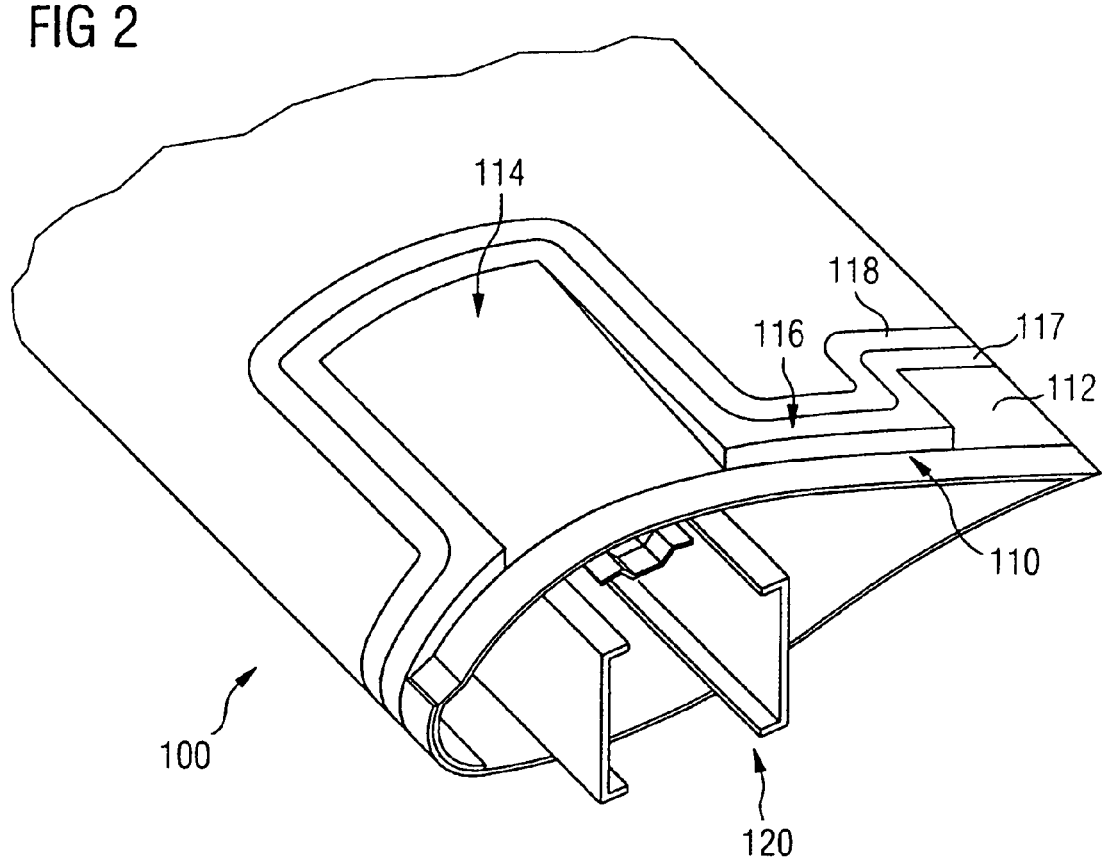

The rotor blade element 100 shown in FIG. 2 is designed in the form of a hollow body with a shell 110 formed from a fiber composite and a bar 120 for absorbing bending moments in the interior of said shell 110. Said shell 110 of the rotor blade element which is arranged radially inside in an assembled state has two fixing segments 112 and 114 at its radially outer end region. In the region of said fixing segments 112 and 114, said rotor blade element 100 is wedged, so that the cross-section of the rotor blade element tapers in a cutting plane extending perpendicularly to the longitudinal direction in the region of the fixing segments 112 and 114 in a wedge-shaped manner. As clearly evident from FIG. 2, the fixing segment 112 extends in a longitudinal direction of the rotor blade element 100 along the rear edge of the rotor blade element 100 facing away from the nose subjected to flow, whereas the fixing segment 114 extends in the region of the bar 120 in a longitudinal direction of the rotor blade element.

A locking rim 116 having two locking segments 117 and 118 extends around the fixing segments 112 and 114. In the region of the outer locking segment 118, only the outer layer of the fiber composite is removed, whereas in the region of the inner locking segment 117, two outer layers of the fiber composite forming the shell 110 are removed. In FIG. 2, only the upper delimitation surface of the shell 110 of the rotor blade element 100 is shown. The lower delimitation surface is similarly designed with two fixing segments, around which a locking rim having two locking segments extends.

In FIG. 3, a rotor blade element 200 which is to be arranged radially outside and which is adjacent to the rotor blade element 100 shown in FIG. 2 in an assembled state is shown. Just like the rotor blade element 100, said rotor blade element 200 has two wedged fixing segments 212 and 214 at its radially inside end region facing the rotor blade element 100 shown in FIG. 2, wherein, just like the fixing segment 112 of the rotor blade element 100, the fixing segment 212 extends in a longitudinal direction of the rotor blade element 200 along the edge of the rotor blade element 200 facing away from the nose of the rotor blade element 200 which is subjected to flow, whereas the fixing segment 214 extends in the region of the bar 220 arranged in the interior of the shell 210 in a longitudinal direction of the rotor blade element 200. A locking rim 216 having two locking segments 217 and 218 also extends around the fixing segments 212 and 214.

FIG. 4 shows a connecting element 300 for connecting said rotor blade elements 100 and 200, which bridges a separation line between these rotor blade elements. The connecting element 300 comprises altogether four fixing segments 312, 312a, 314 and 314a, wherein the connecting segments 312 and 314 are designed to be complementary to the connecting segments 212 and 214, whereas the connecting segments 312a and 314a are designed to be complementary to the connecting segments 112 and 114. This means that the fixing segments of said connecting element 300 taper in a wedge-shaped manner beginning from the separation line formed between the rotor blade elements 100 and 200. A locking rim 316 having two locking segments 317 and 318 extends around the fixing segments 312 and 314 of said connecting element 300. In the same way, a locking rim 316a having two locking segments 317a and 318a extends around the fixing segments 312a and 314a.

The outer locking segments 318 and 318a are formed by a material corresponding to the material of the outer layer of the shells 110 and 210, respectively, whereas the inner locking segments 317 and 317a have a construction corresponding to the construction of the outer two layers of shells 110 and 210, respectively. In this manner, it can be achieved that the connecting element 300 has a laminate-shaped construction corresponding to the construction of adjacent regions of rotor blade elements 100 and 200, wherein, by adapting the locking rims and fixing segments of the connecting element 300 to the structure of the fixing segments and locking rims of the rotor blade elements 100 and 200, an altogether homogenous blade construction without any stiffness discontinuities will be achieved. Thereby, the formation of stress peaks in the region of the separation line between the rotor blade elements 100 and 200 is avoided. A further reduction in the rotor blade loads in the region of the separation line is achieved by the fact that the transitions between the rectilinearly extending edges of the connecting element are rounded, so that discontinuous changes in the blade structure do not occur here either.

Just like the upper connecting element 300 shown in FIG. 4, the lower connecting element 400 shown in FIG. 5 has altogether four fixing segments 412, 412a, 414 and 414a, each of which tapers in a wedge-shaped manner beginning from the separation line. A locking rim 416 having two locking segments 417 and 418 extends around the fixing segments 412 and 414. In the same way, a locking rim 416a having two locking segments 417a and 418a extends around the fixing segments 412a and 414a.

For assembly of the structural members shown in FIGS. 2-5, first the rotor blade elements 100 and 200 are arranged one behind the other in a longitudinal direction and are aligned. Subsequently, said connecting elements 300 and 400 are fixed in the region of their locking rims 316 and 316a, and 416 and 416a, respectively, to corresponding locking rims of the rotor blade elements with the help of a thick resin. The dimensions of the fixing segments of the connecting elements 300 and 400 are adapted to the dimensions of the fixings segments of the rotor blade elements 100 and 200 in such a way that, after fixing the connecting elements 300 and 400 in the region of the locking rims, hollow spaces will still be left between the fixing segments of the rotor blade elements 100 and 200 and the fixing segments of the connecting elements 300 and 400. To stabilize these hollow spaces, adequate spacers can be put into the hollow spaces during assembly. After curing of the thick resin used for adhering the connecting elements 300 and 400 to the rotor blade elements 100 and 200 in the region of the locking rims, the hollow spaces are flooded with an adhesive, wherein the adhesive is injected with overpressure into the formed hollow spaces, in which a negative pressure has been created before.

To create a channel enabling the introduction of the adhesive into the hollow space formed between the fixing segments, when fixing the connecting elements in the region of the locking rims, a strip of gum is put into the region of the locking rims, wherein said strip can be removed for the formation of the channel. By means of the assembly explained above, a fixed connection between the rotor blade elements 100 and 200 without any discontinuous change in the rotor blade structure in the region of the separation line between the rotor blade elements is achieved. Thereby, by the arrangement of the fixings segments in the region of the bars 120 and 220 on the one hand and the edges of the rotor blade elements facing away from the nose subjected to flow, an especially strong connection in the regions stressed most during the operation of a wind power system is achieved.

The invention is not limited to the embodiment explained by the drawing. Rather, also the use of rotor blade elements where the recesses at the ends of the rotor blade elements facing the separation line 16 are wedged in a different manner is considered. Moreover, also the use of rotor blades having more than two rotor blade elements is considered. The connecting elements can have substantially desired shapes here. In particular, it is not necessary that the connecting elements completely surround the longitudinal axis of the rotor blade.

The invention claimed is:

1. A process for producing a rotor blade for a wind power system, wherein at least two rotor blade elements are arranged one behind the other in a longitudinal direction of the rotor blade and are glued together via at least one connecting elements bridging a partition line between the rotor blade elements, wherein at least one connecting element is aligned with said rotor blade elements, wherein a hollow space is formed between an outer delimitation surface of at least one of the rotor blade elements and at least one fixing segment of the inner delimitation surface of said connecting element, and subsequently the hollow space is flooded with an adhesive.

2. The process according to claim 1, wherein the alignment of the connecting element is locked before flooding the hollow space by gluing a locking rim of the inner delimitation surface of the connecting element, at least partially surrounding the fixing segment, to an outer delimitation surface of at least one of the rotor blade elements.

3. The process according to claim 2, wherein said hollow space is sealed tightly at least in the region of the locking rim.

4. The process according to claim 2 or claim 3, wherein the connecting element is glued to at least one of the rotor blade elements in the region of the locking rim with a thickened epoxy resin and/or polyester resin.

5. The process according to claim 1, wherein, for flooding, a negative pressure is generated in the hollow space or the adhesive is pumped into the hollow space with overpressure.

6. The process according to claim 5, wherein the supply of adhesive is effected at the deepest location of the hollow space as seen from the outer delimitation surface of the rotor blade or the negative pressure is generated at the location which is located highest.

7. The process according to claim 1, wherein the adhesive has a dynamic viscosity $\eta$ in the range of about 130-230 Mpas, and a kinematic viscosity $\eta/\rho$ in the range of about $1.2\text{-}2\times10^5$ m$^2$/s.

8. The process according to claim 1, wherein the adhesive is either a liquid epoxy resin or polyester resin.

9. The process according to claim 1, wherein after flooding, the adhesive hardens at room temperature or for a period of time of approximately 6 to 10 hours at a temperature of about 70° C.

10. The process according to claim 1, wherein said rotor blade elements are produced in the same mold, in which, at the desired place of separation, a forming part, and, if necessary, for the formation of the hollow space, a separating film is inserted.

11. The process according to claim 10, wherein at least one connecting element is produced in the same mold as the rotor blade elements.

12. The process according to claim 1, wherein the adhesive is resin.

13. The process according to claim 1, wherein the adhesive has a dynamic viscosity $\eta$ in the range of about 150-210 Mpas, and a kinematic viscosity $\eta/\rho$ in the range of about $1.4$-$1.8 \times 10^5$ m$^2$/s.

14. The process according to claim 1, wherein the adhesive has a dynamic viscosity $\eta$ in the range of about 170-190 Mpas, and a kinematic viscosity $\eta/\rho$ in the range of about $1.6$-$1.8 \times 10^5$ m$^2$/s.

15. The process according to claim 1, wherein the adhesive has a dynamic viscosity $\eta$ of about 180.

16. A rotor blade for a rotor of a wind power system having at least two rotor blade elements arranged one behind the other in a longitudinal direction of the rotor blade and being glued together, comprising at least one connecting elements bridging a partition line between the rotor blade elements and having at least two adherend segments, wherein each of them is glued together with one of the rotor blade elements over a large surface.

17. The rotor blade according to claim 16, wherein said at least one connecting element is at least partially accommodated in a recess formed by the outer delimitation surfaces of the rotor blade elements in the region of the separation line.

18. The rotor blade according to claim 17, wherein said recess at least partially surrounds the longitudinal axis of the rotor blade.

19. The rotor blade according to claim 17 or claim 18, wherein the outer circumference of at least one rotor blade element tapers towards the separation line in a wedge-shaped manner in a cutting plane extending perpendicularly to the longitudinal axis for forming the recess.

20. The rotor blade according to claim 19, wherein said connecting element has an inner delimitation surface extending in a complementary manner to the profile of the recess.

21. The rotor blade according to claim 20, wherein the connecting element has an outer surface which is flush with the adjacent regions of the outer surfaces of the rotor blade elements.

22. The rotor blade according to claim 21, wherein at least one connecting element has a construction corresponding to the construction of adjacent regions of the rotor blade elements.

23. The rotor blade according to claim 22, wherein the construction of the at least one connecting elements is a laminate-shaped construction.

24. The rotor blade according to claim 16, wherein at least one rotor blade element is constructed as a hollow body with a shell accommodating at least one bar absorbing bending forces.

25. A wind power system, comprising a rotor having at least one rotor blade and being pivoted about a rotor axis extending approximately horizontally, wherein the rotor blade comprises at least two rotor blade elements arranged one behind the other in a longitudinal direction of the rotor blade and being glued together, comprising at least one connecting elements bridging a partition line between the rotor blade elements and having at least two adherend segments, wherein each of them is glued together with one of the rotor blade elements over a large surface.

26. A rotor blade element for the rotor of a wind power system, wherein the rotor blade element is connectable with at least one further rotor blade element to form a rotor blade, wherein the rotor blade element and the at least one further rotor blade element are arranged one behind the other in a longitudinal direction of the rotor blade, and the rotor blade element has a recess at the end connectable with the further rotor blade element which is part of a space filled with adhesive in the connected state.

27. The rotor blade element of claim 26, further comprising:
    a shell; and
    a diminution of the shell facing a separation line; wherein the diminution is designed to form a hollow space with a connecting element necessary for assembly of the rotor blade.

28. The rotor blade element according to claim 27, wherein the rotor blade element is a prefabricated longitudinal module.

29. The rotor blade element according to claim 28, wherein the shell of the rotor blade element is one piece.

30. The rotor blade element according to claim 29, wherein the rotor blade element is at least four meters long.

31. A connecting element for bridging a separation line between rotor blade elements for a rotor blade of a wind power system, comprising:
    at least two fixing segments, wherein the at least two fixing segments taper towards the surface of the connecting element in a wedge-shaped manner beginning from the separation line between the rotor blade elements; and
    locking segments surrounding said fixing segments,
    wherein the connecting element has diminutions directed outwardly in the direction of the longitudinal axis of the rotor blade elements to be connected, and
    wherein the diminutions are formed in such a way that the connecting element forms a hollow space with the rotor blade elements to be connected.

* * * * *